United States Patent [19]

Guptill et al.

[11] 4,343,075

[45] Aug. 10, 1982

[54] TOOL FOR DISASSEMBLY OF AUTOMOTIVE UNIVERSAL JOINTS

[75] Inventors: Robert H. Guptill, 4839 Snow Dr., San Jose, Calif. 95111; Raymond G. Penrod, San Jose, Calif.

[73] Assignee: Robert H. Guptill, San Jose, Calif.

[21] Appl. No.: 128,904

[22] Filed: Mar. 10, 1980

[51] Int. Cl.[3] .............................................. B23P 19/02

[52] U.S. Cl. .......................................... 29/251; 29/258

[58] Field of Search ................. 29/256, 258, 259, 260, 29/263, 266, 251; 254/108; 100/295, 266

[56] References Cited

U.S. PATENT DOCUMENTS

| | | | |
|---|---|---|---|
| 1,403,893 | 1/1922 | Carter et al. | 29/263 |
| 1,503,129 | 7/1924 | Miles | 29/263 |
| 1,646,510 | 10/1927 | Weaver | 29/251 |
| 3,568,294 | 3/1971 | Conner | 29/259 |
| 3,648,600 | 3/1972 | Jaccard | 100/266 |
| 3,676,915 | 7/1972 | Ireland | 29/251 |
| 3,786,544 | 1/1974 | Ferguson | 29/256 X |
| 3,881,687 | 5/1975 | Johansson | 254/108 |

*Primary Examiner*—Robert C. Watson
*Attorney, Agent, or Firm*—John J. Leavitt

[57] ABSTRACT

Presented is a tool for application to an automotive universal joint to effect the disassembly thereof from the drive shaft yoke on which it is mounted.

2 Claims, 5 Drawing Figures

TOOL FOR DISASSEMBLY OF AUTOMOTIVE UNIVERSAL JOINTS

BACKGROUND OF THE INVENTION

1. Field of the Invention

This invention relates to tools, and particularly to automotive type hand tools utilized to disassemble the universal joint of a motor vehicle.

2. Description of Prior Art

There are many different types of tools utilized by mechanics to perform specialized functions. For instance, a bench vise may be utilized to impose pressure on an article placed between the jaws thereof. However, a bench vise is not ordinarily portable and constitutes merely a make-shift if it is attempted to use such a vise to disassemble a universal joint. There are various types of bearing and wheel pullers that are designed to be attached to a bearing or wheel that is to be removed from a supporting structure, but these are not suitable for disassembly of a universal joint of the type that is usually found on the drive shaft of a motor vehicle. Accordingly, one of the principal objects of the present invention is the provision of a tool specifically designed for use in conjunction with a universal joint as it is found on the drive shaft of a motor vehicle, and the utilization of that tool to disassemble or remove the universal joint from the drive shaft.

Another object of the invention is the provision of a tool for the disassembly of an automotive universal joint which is designed to impose sufficient pressures to disassemble the universal joint while simultaneously supporting the yoke within which the universal joint is mounted.

Due to modern technology and modern materials, automotive universal joints enjoy a long life. However, an automotive universal joint is located on an automobile, truck or tractor in such a location that it is subjected to many different types of abuses. These include submersion in water, freezing temperatures, heat, impact shocks from the drive train itself and impact shocks from objects lying in the roadway. Through the passage of time and the abuses to which it is subjected, a universal joint will occasionally be damaged to the point where it must be replaced. Because of the length of time it has remained in service, it frequently occurs that the universal joint is particularly difficult to remove because of corrosion and rust formed between mating parts. Accordingly, it is one of the objects of the present invention to provide a hand tool, portable in nature, inexpensive to manufacture yet effective for disassembling a universal joint from a drive shaft quickly and safely.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the tool forming the subject matter of this invention comprises upper and lower cross-head members engaged along opposite edges by tension members in such a manner as to prevent movement of the cross-heads in a direction away from one another. An aperture is provided centrally located in the upper cross-head member, and pressure applying means are operatively related with the aperture in the upper cross-head member. The lower cross-head member is provided with an aperture the axis of which is aligned with the axis of the aperture in the upper cross-head member and is proportioned to receive and permit the passage therethrough of one portion of the universal joint being disassembled.

DESCRIPTION OF THE PREFERRED EMBODIMENT

Figure 1:
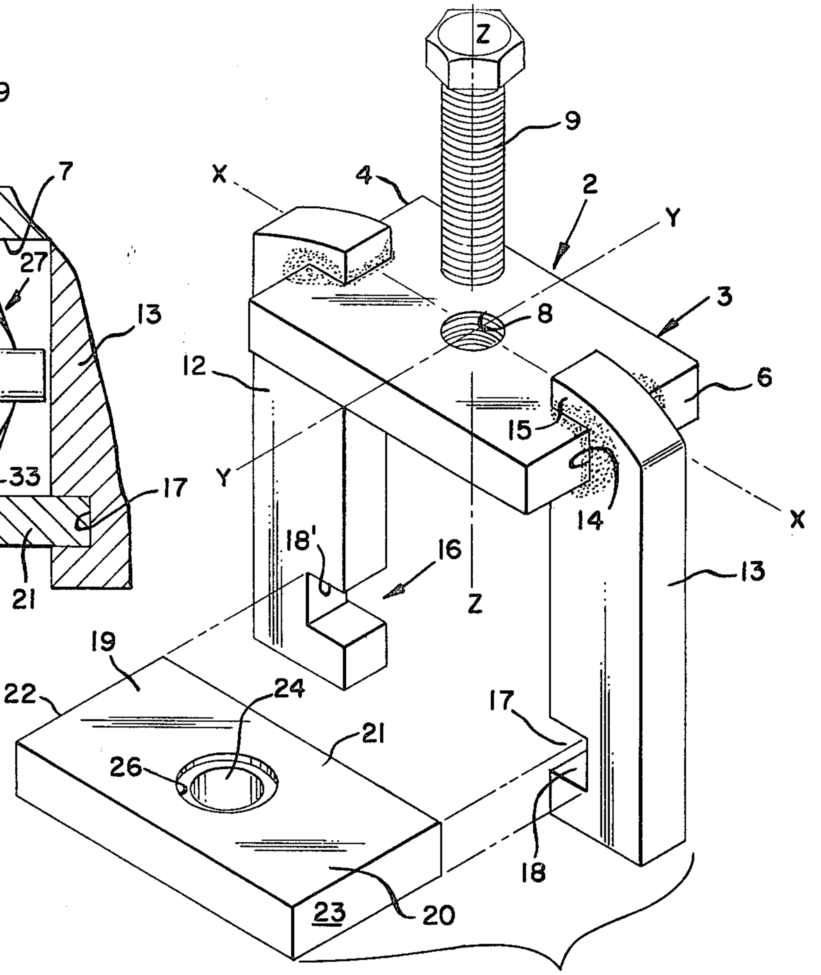
FIG. 1 is a perspective view illustrating one embodiment of the invention, the lower cross-head member being shown detached from the tension members for greater clarity.

In terms of greater detail, the tool forming the subject matter of this invention for use in the disassembly of an automotive universal joint comprises, as depicted in FIG. 1, a composite unit designated generally by the numeral 2 and including an upper cross-head member 3 generally rectangular in its configuration, having end edges 4 and 6 and an undersurface 7 as shown, and being generally symmetrical with respect to X and Y axes defining a plane including the upper cross-head member.

The upper cross-head member 3 constitutes a pressure plate and is provided with a central aperture constituting a threaded bore 8 with which is cooperatively related a pressure applying means in the form of a threaded cap screw 9, the aperture 8 and the pressure applying means 9 being symmetrical in relation to a Z axis perpendicular to the X and Y axes and intersecting the X and Y axes at a common point.

Engaged to opposite edge portions 4 and 6 of the upper cross-head member are a pair of spaced tension members 12 and 13. Each of the tension members is elongated and extends substantially perpendicular to a plane including the X and Y axes, and lies parallel to the other tension member of the pair and parallel to the Z axis but on opposite side thereof from the other tension member of the pair. Preferably, the tension members 12 and 13 lie in a common plane which also includes the X and Z axes and the axis of the aperture 8.

As illustrated, adjacent the upper cross-head member, each of the elongated tension members 12 and 13 is provided with a notch 14 defined by an upper abutment 15 and a lower abutment 15'. The notch 14 of each tension member is adapted to receive the associated edge portion 4 or 6 of the upper cross-head member 3 in a snug fit. In the embodiment of FIG. 1, each of the tension members 12 and 13 is integrally welded to the associated edge of the upper cross-head member as shown by the stippling in the drawings so that each of the tension members becomes an integral part of the upper cross-head member. It will of course be understood that the configuration of the upper cross-head member and the tension members may take another form without departing from the spirit of the invention and the scope of the claims.

Figure 2:
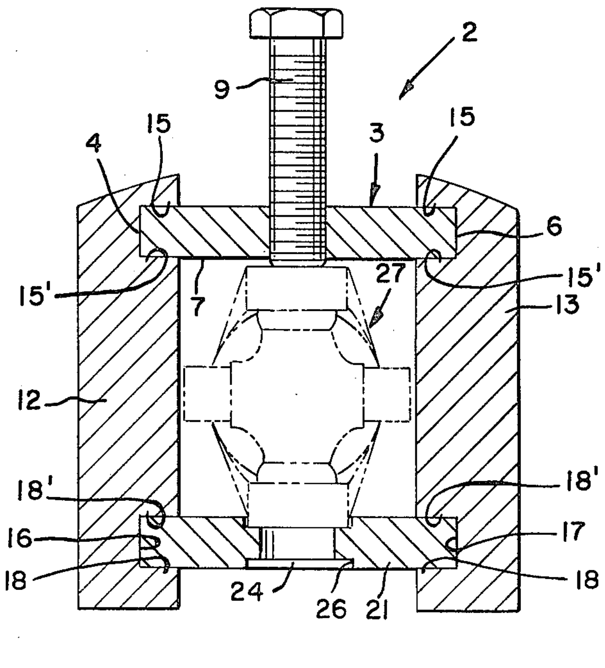
FIG. 2 is a vertical cross sectional view through the assembled tool and showing in broken lines the manner of its application to an automotive universal joint.

As illustrated in FIG. 1, the tension members 12 and 13 adjacent their ends opposite the notches 14 are provided with notches 16 and 17, respectively, each of the notches defined by a lower abutment 18 and an upper abutment 18', each notch being proportioned to snugly receive an edge portion 19 or 20, respectively, of lower cross-head member 21 which is also configured and proportioned so that the edge portions 19 and 20 fit snugly into the notches 16 and 17 and impinge against the lower abutment 18 as illustrated in FIG. 2.

Figure 5:
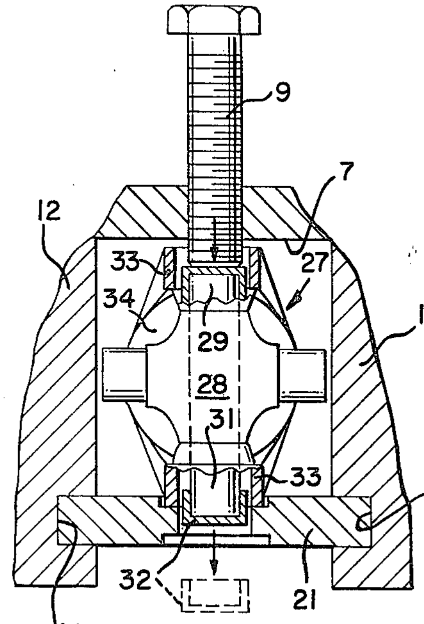
FIG. 5 is a vertical cross sectional view of a fragmentary portion of the tool, but showing the universal joint to which it is applied in full lines and partly in cross-section to better illustrate the manner in which the tool is used to disassemble the universal joint.

To accomodate a portion of the drive shaft to which a universal joint is attached, the lower cross-head member 21 is provided with a central aperture 24 for a purpose which will hereinafter be described. Additionally, the aperture 24 is provided at each opposite end with a rabbet 26 forming a recess into which a bearing member of the universal joint may be seated during the disassembly process. As shown in FIG. 5, the universal joint is designated generally by the numeral 27 and includes a central portion 28 from which extend opposed journal members 29 and 31. Each of these journal members 29 and 31 is appropriately journaled in a bearing cap 32 rotatably arranged on the associated journal, and adapted to snugly fit within the associated bearing sleeve 33 of the drive shaft yoke 34 with which the universal joint is associated.

The difficulty that is encountered in the disassembly of a universal joint such as the one depicted is usually encountered in pressing from the bearing sleeves 33 the bearing caps 32. It has been found that while these bearing caps are usually installed in the associated bearing sleeve by mere finger pressure when the parts are new and lubricated, through the passage of time, such bearing caps 32 become so tightly engaged in the surrounding bearing sleeve 33 that they are extremely difficult to remove. Accordingly, as illustrated in FIG. 5, by inserting the end of the drive shaft yoke into the tool forming the subject matter of this invention, so that one of the bearing sleeves 33 rests in the recess formed by rabbet 26 formed in the lower cross-head member 21, the spindle or cap screw 9 may be turned down against the opposite bearing cap so that both bearing caps are pushed downwardly out of the surrounding bearing sleeves 33, which are supported against such pressure by the lower cross-head member in the manner shown. It will be found that the lower bearing cap 32 will be pushed through the aperture 24 as the body of the universal joint moves downwardly under the force exerted by the pressure applying means 9. Simultaneously, the opposite bearing cap against which the pressure applying means 9 is imposing a downward force, will be forced from the surrounding bearing sleeve 33 so that both bearing caps 32 will be released substantially simultaneously from the yoke formed by the bearing sleeves 33.

Figure 3:
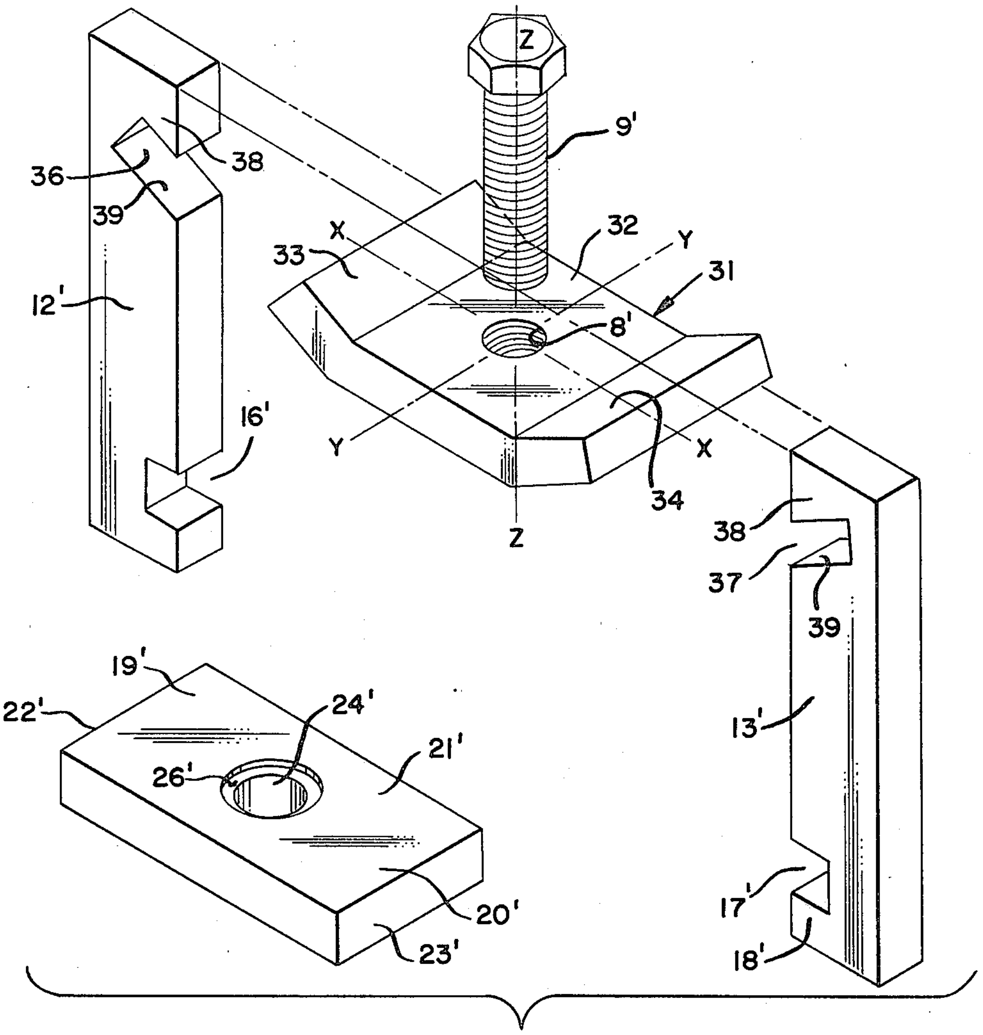
FIG. 3 is a second embodiment of the invention, shown in exploded form for greater clarity.
Figure 4:
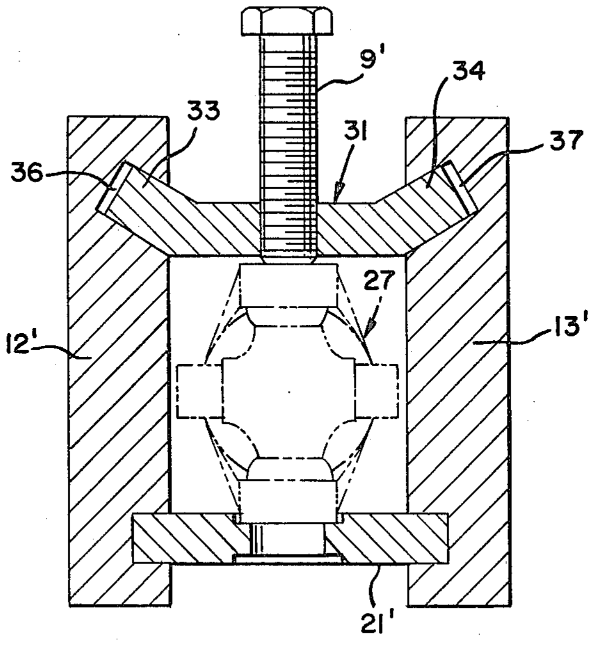
FIG. 4 is a vertical cross sectional view of the embodiment illustrated in FIG. 3, shown in assembled form, with the universal joint to which it is applied being shown in broken lines.

Referring to the embodiment of the invention illustrated in FIGS. 3 and 4, it will be seen that this embodiment of the invention is very similar to the embodiment illustrated in FIG. 1, and accordingly, like parts are indicated with corresponding primed reference numbers. The difference in the embodiment lies chiefly in the different relationship of the upper cross-head member 31 with the associated tension members 12' and 13'. The upper cross-head member 31 includes a central section 32 centrally apertured as before by a threaded bore 8' and having upturned edge portions 33 and 34 as shown. These upturned edge portions may be integrally formed on plate 32 through any appropriate operation such as stamping or die casting, or they may be appropriately welded to the associated edges of the central section 32. In either case, the edge portions 33 and 34 are inclined upwardly out of the plane of the central section 32, the degree of inclination corresponding to the degree of inclination of notches 36 and 37 formed adjacent the upper end portions of the tension members 12' and 13', each notch defined by upper abutment 38 and lower abutment 39 as illustrated, so that each notch is inclined in relation to the Z axis.

Thus, in this embodiment of the invention, as illustrated in FIG. 4, when the tension members 12' and 13' are engaged through notches 36 and 37 with the edge portions 33 and 34 of the upper cross-head member 31, the assembly will be as illustrated in FIG. 4, and the tool may be used as before to push the central body portion of the universal joint from the confining bearing sleeves of an associated drive shaft yoke.

It has been found through experimentation that the force imposed at the jointure of the upper cross-head member with the tension members is so great as to impose great stress at the root of the abutments against which the upper cross-head member impinges. It has been found that suitable heat treating of this area of the tension members and the associated edge portions of the upper cross-head members may be effected to provide these members with sufficient strength to easily withstand the stresses that are imposed at this location.

Referring again to the embodiment of the invention illustrated in FIGS. 3 and 4, it will be seen that translation of the pressure applying means 9' downwardly so that it impinges upon the bearing caps of the universal joint imposes a downwardly directed force on the lower cross-head member 21' and upward force on the upper cross-head member 31. Concomitantly, since both the upper and lower cross-head members are engaged by their respective abutments on the tension members 12' and 13', the forces tending to separate the upper and lower cross-head members has the effect of drawing the upper ends of the tension members 12' and 13' inwardly toward the Y and Z axes because of the inclination of the upper abutments 38. This tendency precludes the separation of these members during the disassembly process.

Having thus described the invention, what is believed to be new and novel and sought to be covered by Letters Patent of the United States is as follows:

1. A portable tool for effecting the disassembly of a vehicular-type universal joint from the drive-shaft bearing yoke on which it is normally mounted, (a) an upper cross-head member having a threaded aperture therethrough;

(b) a pair of oppositely disposed tension members engaging opposite edge portions of said upper cross-head member and extending therefrom in spaced parallel relation to one another and terminating in free end portions having abutments thereon;

(c) a lower cross-head member having opposite edge portions engaging said abutments and restricted against movement in a direction away from said upper cross-head member by said abutments and engageable with said abutments by movement in a direction transverse to said tension members, said lower cross-head member having an aperture therein the axis of which is coincident with the axis of the aperture in said upper cross-head member when said lower cross-head member is properly positioned on said abutments by transverse movement thereof between said tension members, said upper cross-head member including a central body portion and integral inclined edge portions on said body portion, the abutments on the free end portions of said tension members being correspondingly inclined whereby tension imposed on said tension members when engaged on said inclined edge portions imposes a force on said tension members tending to prevent separation thereof during use of the tool; and (d) pressure applying means associated with the aperture in said upper cross-head member and operable to impose pressure on a universal joint positioned between said upper and lower cross-head members and oriented with the aperture in said lower cross-head member whereby the universal joint is pressed from the bearing yoke in which it is normally retained.

2. The combination according to claim 1, in which said inclined edge portions of the upper cross-head member are inclined away from the lower cross-head member.

* * * * *